(12) United States Patent
Kaho et al.

(10) Patent No.: US 9,136,893 B2
(45) Date of Patent: Sep. 15, 2015

(54) RECEIVER

(75) Inventors: Takana Kaho, Yokosuka (JP); Yo Yamaguchi, Yokosuka (JP); Hiroyuki Shiba, Yokosuka (JP); Doohwan Lee, Yokosuka (JP); Takayuki Yamada, Yokosuka (JP); Kazunori Akabane, Yokosuka (JP); Kazuhiro Uehara, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 415 days.

(21) Appl. No.: 13/520,268

(22) PCT Filed: Jan. 12, 2011

(86) PCT No.: PCT/JP2011/050347
§ 371 (c)(1),
(2), (4) Date: Jul. 2, 2012

(87) PCT Pub. No.: WO2011/087016
PCT Pub. Date: Jul. 21, 2011

(65) Prior Publication Data
US 2012/0281718 A1 Nov. 8, 2012

(30) Foreign Application Priority Data
Jan. 12, 2010 (JP) ................................ 2010-004325

(51) Int. Cl.
*H04B 1/16* (2006.01)
*H04B 1/30* (2006.01)
*H04B 1/00* (2006.01)

(52) U.S. Cl.
CPC ................ *H04B 1/30* (2013.01); *H04B 1/0057* (2013.01)

(58) Field of Classification Search
USPC .......... 455/150.1, 179.1, 180.1, 188.1, 189.1, 455/190.1, 323, 255, 256, 257, 258
See application file for complete search history.

(56) References Cited

U.S. PATENT DOCUMENTS

2008/0253431 A1 10/2008 Ohba
2009/0156155 A1 6/2009 Krug et al.

FOREIGN PATENT DOCUMENTS

| CN | 1547800 A | 11/2004 |
|---|---|---|
| EP | 1 473 845 A1 | 11/2004 |
| JP | 11-298296 A | 10/1999 |
| JP | A-2000-022576 | 1/2000 |
| JP | A-2000-269832 | 9/2000 |

(Continued)

OTHER PUBLICATIONS

Ito, Nobuyuki, et al., "Rigorous Study on Cellular Phone and its System," CQ publisher, RF World, No. 2, pp. 57-67, Apr. 2008.

(Continued)

*Primary Examiner* — Blane J Jackson
(74) *Attorney, Agent, or Firm* — Harness, Dickey & Pierce, P.L.C.

(57) ABSTRACT

A receiver includes a local signal generator, a power phase adjuster, and a frequency converter so as to perform frequency conversion on signals included in a plurality of radio frequency bands. The local signal generator supplies a plurality of local signals. The power phase adjuster adjusts local signals in terms of signal power or relative phases. The frequency converter performs frequency conversion on radio frequency bands by use of local signals adjusted with the power phase adjuster, thus sorting them in a desired frequency range.

10 Claims, 15 Drawing Sheets

(56) References Cited

FOREIGN PATENT DOCUMENTS

| JP | A-2006-148521 | | 6/2006 | |
| JP | A-2007-142819 | | 6/2007 | |
| JP | A-2009-147943 | | 7/2009 | |
| WO | 99/25075 A2 | | 5/1999 | |
| WO | WO 99/25075 | * | 5/1999 | ............... H04B 1/26 |

OTHER PUBLICATIONS

Kurihara, Jun, et al., "Software Radio Receiver Using RF Filter Bank," Institute of Electronics, Information and Communication Engineers, Shingaku Technical Report, RCS2004-133, pp. 79-84, Aug. 2004.

Search Report, European Patent Application No. 11732886.4, Oct. 7, 2013.

International Search Report for PCT/JP2011/050347, ISA/JP, mailed Feb. 8, 2011, with English translation.

Notice of Reasons for Rejection, Japanese Patent Application No. 2011-549986, Jan. 8, 2013.

Office Action, Chinese Patent Application No. 201180005345.0, Aug. 12, 2014.

* cited by examiner

RECEIVER

CROSS-REFERENCE TO RELATED APPLICATIONS

This application is a 371 U.S. National Stage of International Application No. PCT/JP2011/050347, filed Jan. 12, 2011, which claims priority to Japanese Patent Application No. 2010-4325 filed Jan. 12, 2010, the entire content of which is incorporated herein by reference.

TECHNICAL FIELD

The present invention relates to a receiver that performs communication using a plurality of radio bands.

BACKGROUND ART

Due to diversification of radio communication applications, receivers (multiband receivers), which are able to receive signals in a plurality of frequency bands, need to broaden reception bands thereof.

Conventional multiband receivers may subdivide frequency bands for a plurality of radio frequency bands so as to arrange reception mixers for the respective frequency bands, or they may limit the number of radio frequency bands, which can be concurrently received therewith, so as to arrange the prerequisite number of reception circuits (e.g. see NPL 1, NPL 2).

CITATION LIST

Non Patent Literature

NPL 1: Ito et al, "Rigorous Study on Cellular Phone and its System", CQ publisher, RF World No. 2, p 57, April 2008
NPL 2: Kurihara Jun, Suzuki Hiroshi, "Software Radio Receiver Using RF Filter Bank", Institute of Electronics, Information and Communication Engineers, Shingaku Technical Report RCS2004-133, August 2004

SUMMARY OF INVENTION

Technical Problem

However, the technology of NPL 1 may suffer from a problem in that the circuit scale thereof must be increased due to the increasing number of radio frequency bands when it arranges reception circuits corresponding to radio frequency bands.

The present invention is made in consideration of the foregoing circumstances and provides a receiver that is able to suppress an increase of the circuit scale due to the increasing number of radio frequency bands.

Solution to Problem

The present invention is provided to solve the above problem. The present invention relates to a receiver that performs frequency conversion on signals included in a plurality of radio frequency bands, which includes a local signal generator that supplies a plurality of local signals, an adjuster that adjusts local signals in terms of power or relative phases, and a frequency converter that concurrently converts frequencies, belonging to the plurality of radio frequency bands, by use of the adjusted local signals, thus sorting them in a desired frequency range.

In the receiver of the present invention, it is preferable that the frequency converter convert the frequencies of signals, included in a frequency range corresponding to at least one of a lower frequency band than the frequency of each local signal or a higher frequency band than the frequency of each local signal, in response to a relative phase difference between local signals.

In the receiver of the present invention, it is preferable that the frequency converter perform frequency conversion based on local signals while performing image suppression or separately outputting the lower frequency band than the frequency of each local signal or the higher frequency band than the frequency of each local signal.

In the receiver of the present invention, it is preferable that the adjuster generate and supply a pair of local signals with a perpendicular phase difference therebetween based on local signals.

In the receiver of the present invention, it is preferable that the adjuster further include a relative phase difference setting part that switches over a relative phase difference between local signals with a perpendicular phase difference therebetween.

In the receiver of the present invention, it is preferable that the frequency converter convert the frequencies of signals, included in a frequency range corresponding to at least one of a lower frequency band than the frequency of each local signal or a higher frequency band than the frequency of each local signal, in response to the frequencies of local signals.

In the receiver of the present invention, it is preferable that the local signal generator further include a direct digital synthesizer supplying local signals.

In the receiver of the present invention, it is preferable to further include a signal processor that detects power for each frequency band including the frequency converted signal, and a controller which reduces a power difference of signals belonging to their frequency bands in response to the detected power and which adjusts an attenuation value attenuating each local signal assigned to each frequency band or at least one of the frequency of each local signal or the relative phase difference between local signals, thus allocating signals on a frequency axis with a narrow interval therebetween.

In the receiver of the present invention, it is preferable that the signal processor transmit the frequency converted signal, subjected to frequency conversion with the frequency converter, via a transmission means which is arranged in a different place from the frequency converter.

Additionally, the present invention relates to a receiver that receives signals belonging to a plurality of radio frequency bands, which includes an adjuster that is connected to a plurality of local signal sources so as to adjust signal power or phases; a power combiner that combines a plurality of local signals whose signal power and phases are adjusted with the adjuster; a band-pass filter that is connected to an antenna receiving signals belonging to a plurality of radio frequency bands so as to pass a desired signal, among signals corresponding to a plurality of radio frequency bands, therethrough; a low noise amplifier that is connected to the band-pass filter; a mixer that is connected to an output terminal of the low noise amplifier so as to perform frequency conversion on a plurality of local signals which are combined together with the power combiner; a filter that is supplied with signals subjected to frequency conversion with the mixer; and a variable gain amplifier that is connected to the filter.

Advantageous Effects of Invention

According to this invention, a receiver is able to concurrently convert frequencies of signals included in a plurality of radio frequency bands. The local signal generator supplies a plurality of local signals. The adjuster adjusts local signals in terms of power or relative phases. The frequency converter concurrently converts frequencies of radio frequency bands by use of local signals, thus sorting them in a desired frequency range.

Thus, the receiver is able to suppress an increase of the circuit scale irrespective of the increasing number of radio frequency bands.

DESCRIPTION OF EMBODIMENTS

Hereinafter, one embodiment of the present invention will be described with reference to the drawings.

First Embodiment

Figure 1:
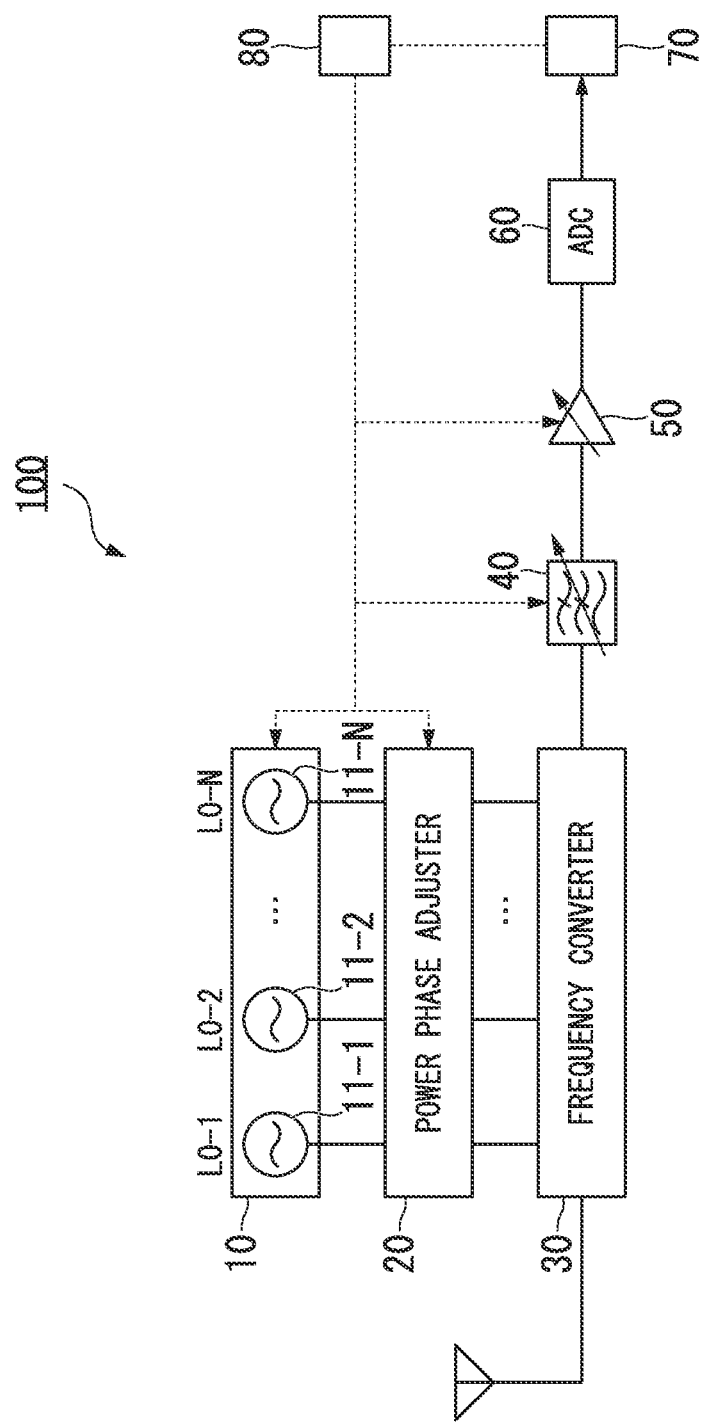
FIG. 1 A block diagram showing a receiver according to a first embodiment of the present invention.

FIG. 1 is a block diagram showing the constitution of a receiver according to a first embodiment of the present invention.

Referring to FIG. 1, a receiver 100 includes a local oscillation signal generator 10, a power phase adjuster 20, a frequency converter 30, a frequency band limiter 40, a variable gain amplifier 50, an analog/digital converter 60, a signal processor 70, and a controller 80.

The local signal generator 10 generates and outputs a plurality of local oscillation signals (local signals) with the preset frequencies. The local oscillation signal generator 10 includes a plurality of local oscillators 11-1, 11-2, . . . , 11-N that output a plurality of frequencies LO-1, LO-2, . . . , LO-N, which differ from each other.

The power phase adjuster 20 controls local signals, supplied by the local signal generator 10, in terms of the power, frequency, and phase in response to the setting, thus outputting them to the frequency converter 30.

The frequency converter 30 performs frequency conversion on radio signals received via an antenna. The frequency converter 30 performs frequency conversion in response to local signals, which are generated by the local signal generator 10 and supplied thereto via the power phase adjuster 20, so as to allocate them at desired frequencies in a baseband or an intermediate frequency (IF) band. Owning to the frequency conversion, the frequency converter 30 is able to control frequency allocation in a baseband or an IF band. In addition to the frequency conversion, the frequency converter 30 is able to adjust gains of frequency conversion in response to the power, frequency, and phase of local signals input thereto.

The frequency band limiter 40 limits frequency bands of received signals which have been converted by the frequency converter 30.

The variable gain amplifier (VGA) 50 performs amplification with an amplification ratio which is set in response to the signal power of received signals.

The analog/digital converter 60 performs sampling on analog signals supplied thereto so as to convert them into digital signals depending on their signal intensity, thus generating digital signals representing time-series data.

The signal processor 70 performs various types of signal processing necessary for reception processing. That is, the signal processor 70 performs an error control process, a decoding process, and an expansion process on received signals as well as a process of monitoring received signals.

The controller 80 controls various parts of the receiver 100 in response to a setting signal from a master controller or the like. Additionally, the controller 80 may control various parts based on the signal power detected by the signal processor 70.

The detailed constitution of a receiver of the present embodiment will be described.

Figure 2:
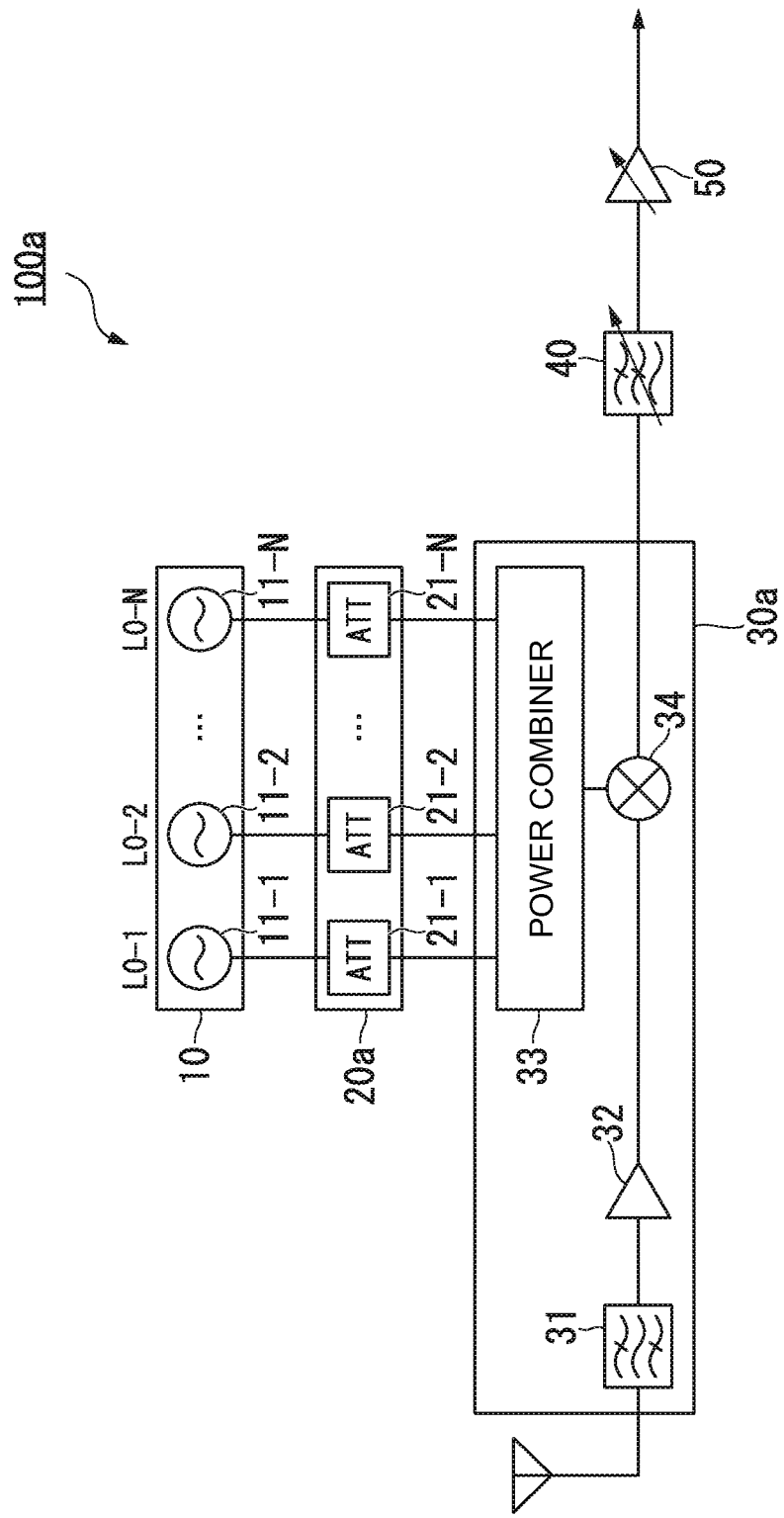
FIG. 2 A block diagram showing the detailed constitution of the receiver according to the first embodiment of the present invention.

FIG. 2 is a block diagram showing the constitution of a receiver of the present embodiment. The constituent elements identical to those of FIG. 1 are designated by the same reference numerals.

Referring to FIG. 2, a receiver 100a includes the local signal generator 10, a power phase adjuster 20a, a frequency converter 30a, the frequency band limiter 40, and the variable gain amplifier (VGA) 50.

The power phase adjuster 20a includes variable attenuators (ATT) 21-1, 21-2, ..., 21-N (collectively referred to as "ATT 21"), each of which attenuates the power of each local signal, supplied from the local signal generator (LO) 10, based on the setting. The ATT 21 is arranged in response to local signals supplied from the local signal generator 10. The ATT 21 is able to independently set its attenuation ratio, thus setting the power necessary for each local signal.

The frequency converter 30a includes a band-pass filter 31, a low noise amplifier 32, a power combiner 33, and a mixer 34.

The band-pass filter (BPF) 31 is coupled with an antenna, so that it extracts RF signals belonging to all frequency bands subjected to reception processing from radio frequency (RF) signals received via the antenna.

The low noise amplifier (LNA) 32 amplifies RF signals which have been subjected to filtering with the BPF 31.

The power combiner 33 synthesizes or combines local signals which are supplied from the local signal generator 10 via the power phase adjuster 20a.

The mixer 34 mixes RF signals, amplified by the LNA 32, with local signals supplied from LO 10, thus converting RF signals into frequencies in a baseband or an IF band.

The frequency band limiter 40 is a filter having a transfer function representing a low-pass characteristic or a band-pass characteristic. A filter having a transfer function representing a low-pass characteristic may as well exhibit a band-pass characteristic owing to a DC-component elimination capacitor (not shown) blocking a DC current; hence, this drawing shows a filter having a transfer function representing a band-pass characteristic. A low cutoff frequency, according to the transmission characteristic of the frequency band limiter 40, is determined based on a band of a band-pass filter or based on a cutoff frequency depending on a characteristic impedance of circuitry and a DC-component elimination capacitor. Additionally, a high cutoff frequency, according to the transmission characteristic of the frequency band limiter 40, is determined based on a sampling frequency which is needed in digitization of signals in the latter stage of circuitry. The frequency band limiter 40 extracts signals belonging to frequency bands which are necessary for received signals subjected to frequency conversion.

The local signal generator 10, the power phase adjuster 20a, the frequency band limiter 40, and the variable gain amplifier (VGA) 50 operate based on the setting of the controller 80 (FIG. 1).

Next, the frequency conversion of the receiver of the present embodiment will be described with reference to FIGS. 3A and 3B.

Figure 3A:
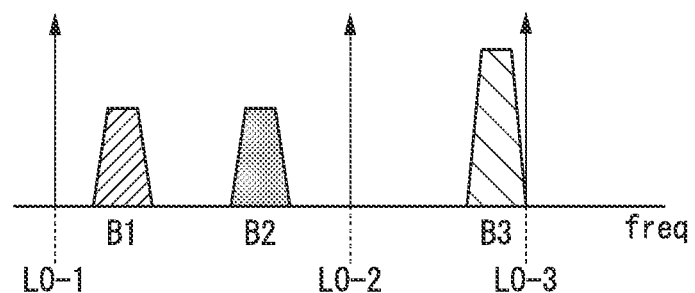
FIG. 3A A drawing illustrating the operation of the receiver according to the first embodiment of the present invention.

FIG. 3A shows the channel allocation of RF signals, which are extracted by the BPF 31, amplified by the LAN 32, and then supplied to the mixer 34, and the frequency allocation of local signals. In FIG. 3A, the horizontal axis represents the frequency range relating to bands of RF signals whilst the vertical axis represents the signal power relating to each frequency band (band).

This drawing illustrates the state of receiving RF signals in an order of lower frequencies, i.e. an order from band B1 to band B3, indicating the state in which the signal power of an RF signal of band B3 is higher than the signal power of other channels.

This drawing shows the relationship between frequencies LO-1, LO-2, LO-3 of local signals, supplied from the LO 10, and frequency bands of RF signals.

Band B1 is allocated to the higher frequency band than the frequency of each local signal with respect to a local signal of frequency LO-1; band B2 is allocated to the lower frequency band than the frequency of each local signal with respect to a local signal of frequency LO-2; and band B3 is allocated to the lower frequency band than the frequency of each local signal with respect to a local signal of frequency LO-3, which is allocated in proximity to the upper limit of a frequency band of band B3. Prior to frequency conversion carried out by the frequency converter 30, the foregoing signals are converted into frequencies representing differences between their frequencies and frequencies of local signals and thus allocated to a baseband. It is possible to convert them to desired frequencies in a baseband by selecting frequencies LO-1 to LO-3 of local signals with appropriate intervals relative to the frequencies of bands B1 to B3. Thus, it is possible to juxtapose bands in a low frequency range with narrow intervals therebetween by determining frequency allocation not causing mutual interference. At this time, it is necessary to set the relationship between frequencies of local signals and frequencies of bands prior to frequency conversion such that bands after frequency conversion will not overlap with each other.

Figure 3B:
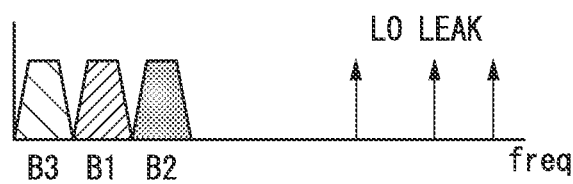
FIG. 3B A drawing illustrating the operation of the receiver according to the first embodiment of the present invention.

FIG. 3B shows the results of frequency conversion on signals in bands shown in FIG. 3A.

In FIG. 3B, the horizontal axis represents the frequency range of baseband signals whilst the vertical axis represents the signal power in frequencies (channels). Signals shown in this drawing are signals which are subjected to frequency conversion with the frequency converter 30 and then outputted via the frequency band limiter 40 and the VGA 50.

Based on the result of frequency conversion, bands are allocated in the order of ones proximate to DC, i.e. bands B3, B1, and B2. Although leakage of local signals, and unwanted signals such as cross modulation distortion may occur in a high frequency range, their power will be suppressed by way of band limitation with the frequency band limiter 40.

A signal of band B3 is attenuated in power at the same level of other signals of bands B1 and B2. As a method for reducing conversion gain of band B3 to be lower than that of bands B1 and B2, it is possible to employ a method in which an attenuation value of the ATT 21-3 is significantly increased to thereby reduce the power of LO-3 to be relatively lower than the power of frequencies LO-1 and LO-2.

With a low cutoff frequency determined by the frequency band limiter 40 and the DC component elimination capacitor, it is possible to allocate at least a part of band B3, which is placed in the lowest frequency band, to a low frequency range, thus attenuating the signal power of band B3 to match the power of other bands.

As described above, owing to the controller 80 that sets the power and frequency of local signals with the LO 10, it is possible to suppress signals of channels with high signal power and to allocate signals of bands within a limited frequency range.

Second Embodiment

Next, a receiver according to a second embodiment of the present invention will be described with reference to FIG. 4.

Figure 4:
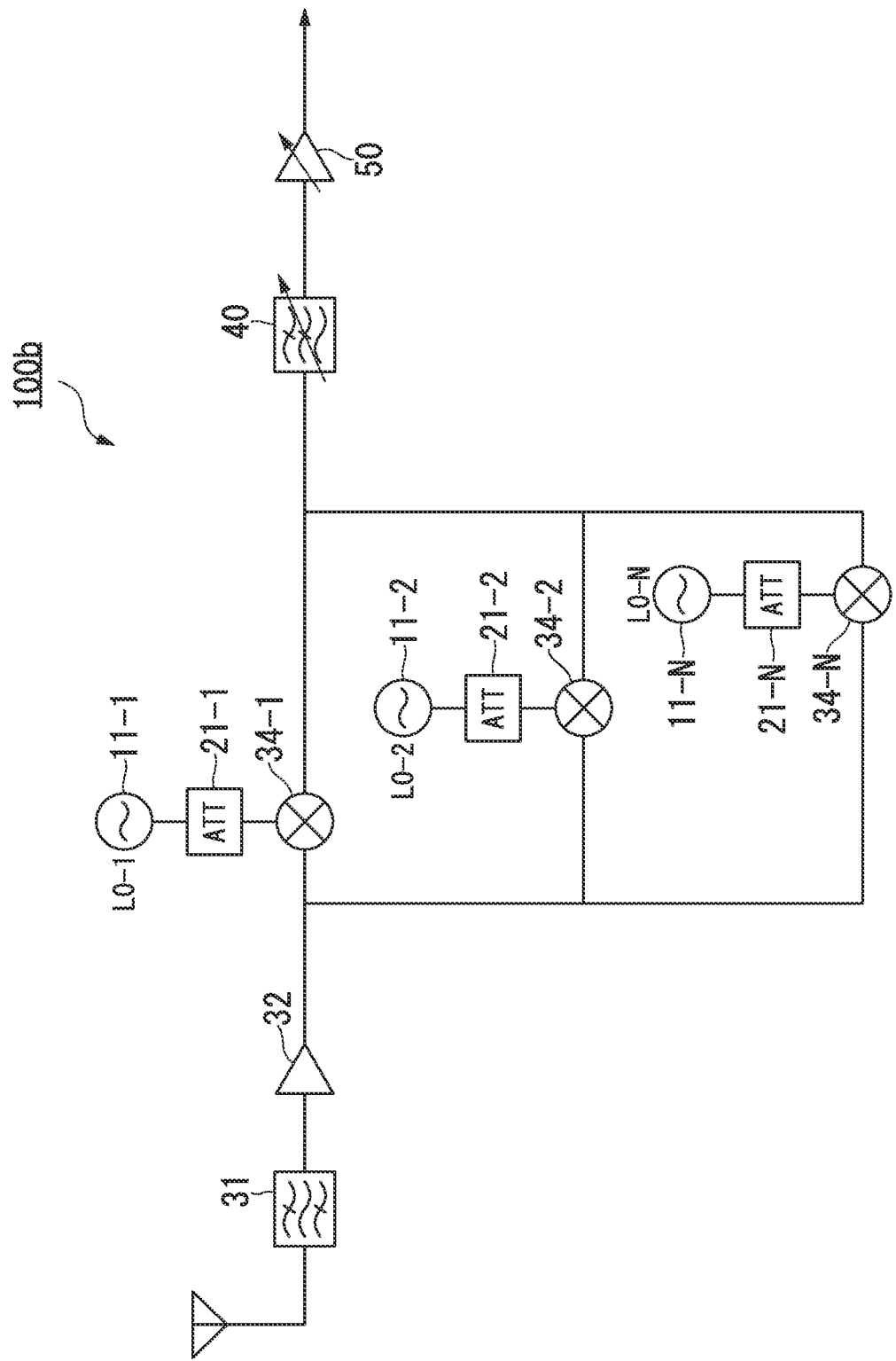
FIG. 4 A block diagram showing the constitution of a receiver according to a second embodiment of the present invention.

FIG. 4 is a block diagram showing the constitution of the receiver according to the second embodiment of the present invention. The constituent elements identical to those shown in FIGS. 1 and 2 are denoted using the same reference signs.

Referring to FIG. 4, a receiver 100b includes a plurality of local oscillators 11-1, 11-2, ..., 11-N, which correspond to the local signal generator (LO) 10 of the first embodiment, and a plurality of variable attenuators (ATT) 21-1, 21-2, ..., 21-N, which correspond to the power phase adjuster 20a of the first embodiment. Additionally, the receiver 100b includes a plurality of mixers 34-1, 34-2, ..., 34-N, which correspond to the mixer 34 of the first embodiment. The frequency converter 30a of the first embodiment is configured of the band-pass filter 31, the low noise filter 32, and the mixers 34-1 to 34-N. Similar to the first embodiment, this frequency converter is connected to the frequency band limiter 40 and the variable gain amplifier 50.

The mixers 34-1 to 34-N are individually arranged in connection with the local oscillators 11-1 to 11-N, included in the local signal generator (LO), and the variable attenuators (ATT) 21-1 to 21-N, included in the power phase adjuster.

The mixers 34-1 to 34-N are connected between the output terminal of the LNA 32 and the input terminal of the frequency band limiter 40. The mixers 34-1, 34-2, ..., 34-N perform frequency conversion on signals supplied from the LNA 32 in response to local signals supplied thereto, thus providing the frequency band limiter 40 with signals whose frequencies are converted into a baseband.

The detailed constitution of mixers in the present embodiment will be described with reference to FIG. 5.

Figure 5:
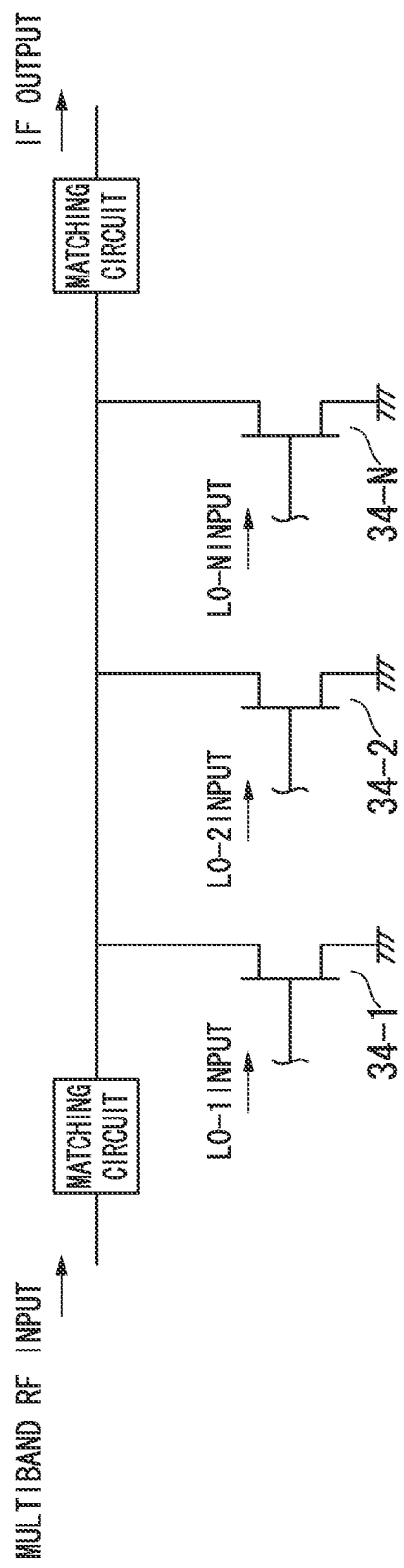
FIG. 5 A block diagram showing the constitution of a mixer according to the second embodiment of the present invention.

FIG. 5 shows a circuit configuration relating to the mixers 34-1, 34-2, ..., 34-N in the present embodiment. The constituent elements identical to those of FIG. 4 are denoted using the same reference signs. In this drawing, the mixers 34-1, 34-2, ..., 34-N are each configured of a field-effect transistor (FET) and a matching circuit. The sources of FETs are grounded; the drains thereof are connected in common; and the gates thereof are supplied with local signals LO-1, LO-2, ..., LO-N. It is possible to independently change conversion gains, with which multiband RF signals, supplied to drains of FETs, are converted into a baseband, in response to local signals supplied to the gates of FETs, so that mixers are able to perform frequency conversion in response to local signals, thus producing baseband signals.

It is possible to independently control the conversion gains of the mixers 11-1, 11-2, ..., 11-N by independently controlling the variable attenuators (ATT) 21-1, 21-2, ..., 21-N included in the power phase adjuster 20.

Third Embodiment

A receiver according to a third embodiment of the present invention will be described with reference to FIG. 6.

Figure 6:
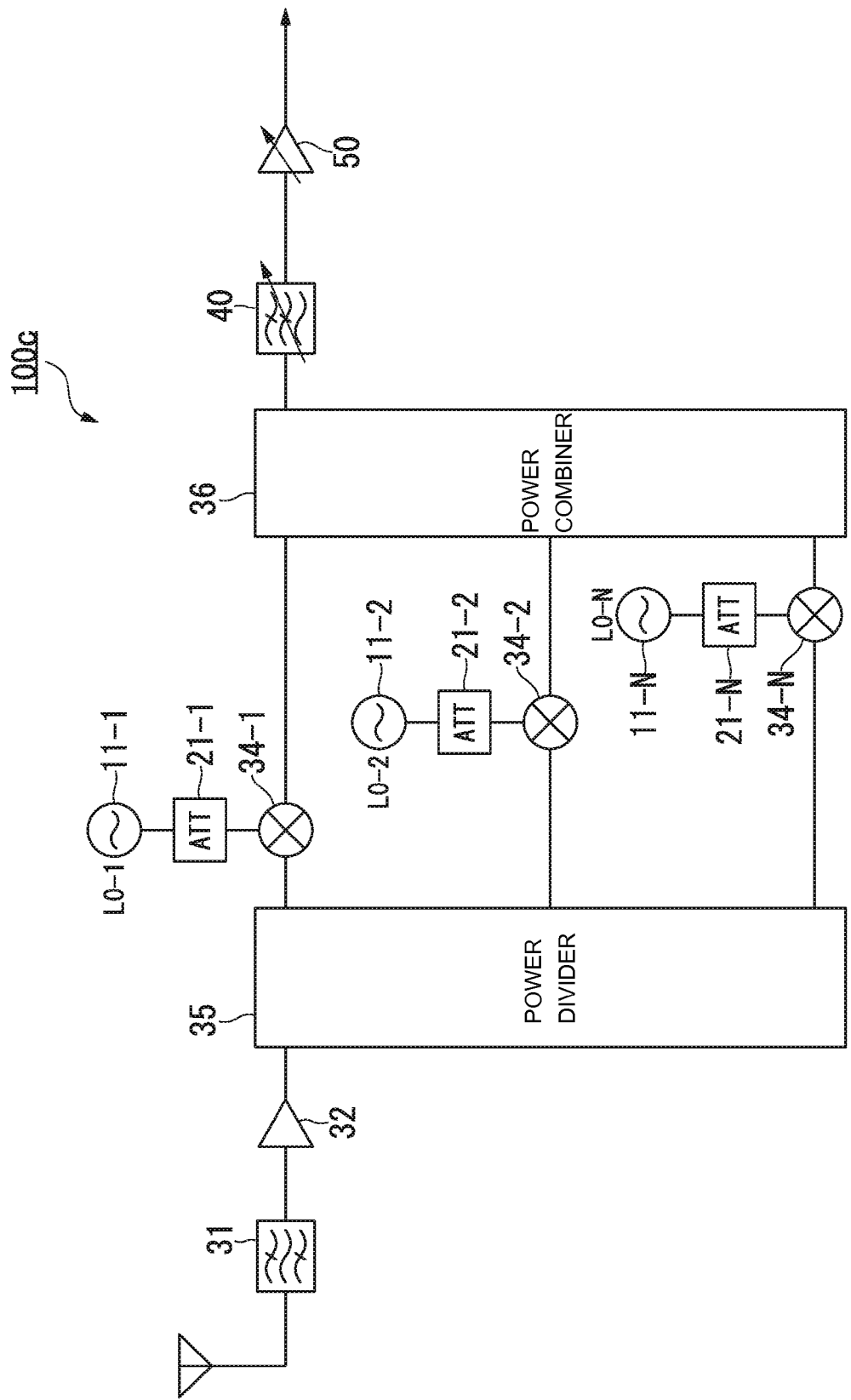
FIG. 6 A block diagram showing the constitution of a receiver according to a third embodiment of the present invention.

FIG. 6 is a block diagram showing the receiver according to the third embodiment of the present invention. The constituent elements identical to those of the foregoing embodiments shown in FIGS. 1, 2, and 4 are denoted using the same reference signs.

Referring to FIG. 6, a receiver 100c includes a plurality of local oscillators 11-1, 11-2, ..., 11-N, which correspond to the local signal generator 10 of the first embodiment, and a plurality of variable attenuators (ATT) 21-1, 21-2, ..., 21-N, which correspond to the power phase adjuster 20a of the first embodiment.

A frequency converter is configured of the band-pass filter 31, the low noise amplifier 32, the mixers 34-1 to 34-N, a power divider 35, and a power combiner 36. The frequency converter is connected to the frequency band limiter 40 and the variable gain amplifier 50.

The power divider 35 is interposed between the LNA 32 and the mixer 34-1, 34-2, ..., 34-N, wherein it divides multiband RF signals, supplied from the LNA 32, into signals of subdivided frequencies applied to the mixers 34-1, 34-2, ..., 34-N. In this connection, the power divider 35 may be configured of a power divider.

The power combiner 36 is interposed between the mixers 34-1, 34-2, ..., 34-N and the frequency band limiter 40, wherein it combines baseband signals supplied from the mixers 34-1, 34-2, ..., 34-N.

The constitution of this drawing is able to perform the same operation as the constitution shown in FIG. 4. Compared to the constitution of FIG. 4, it is able to secure isolation between mixers by use of the power divider 35 and the power combiner 36 so that it has an advantage in reducing generation power of unwanted waves.

Fourth Embodiment

A receiver according to a fourth embodiment of the present invention will be described with reference to FIG. 7.

Figure 7:
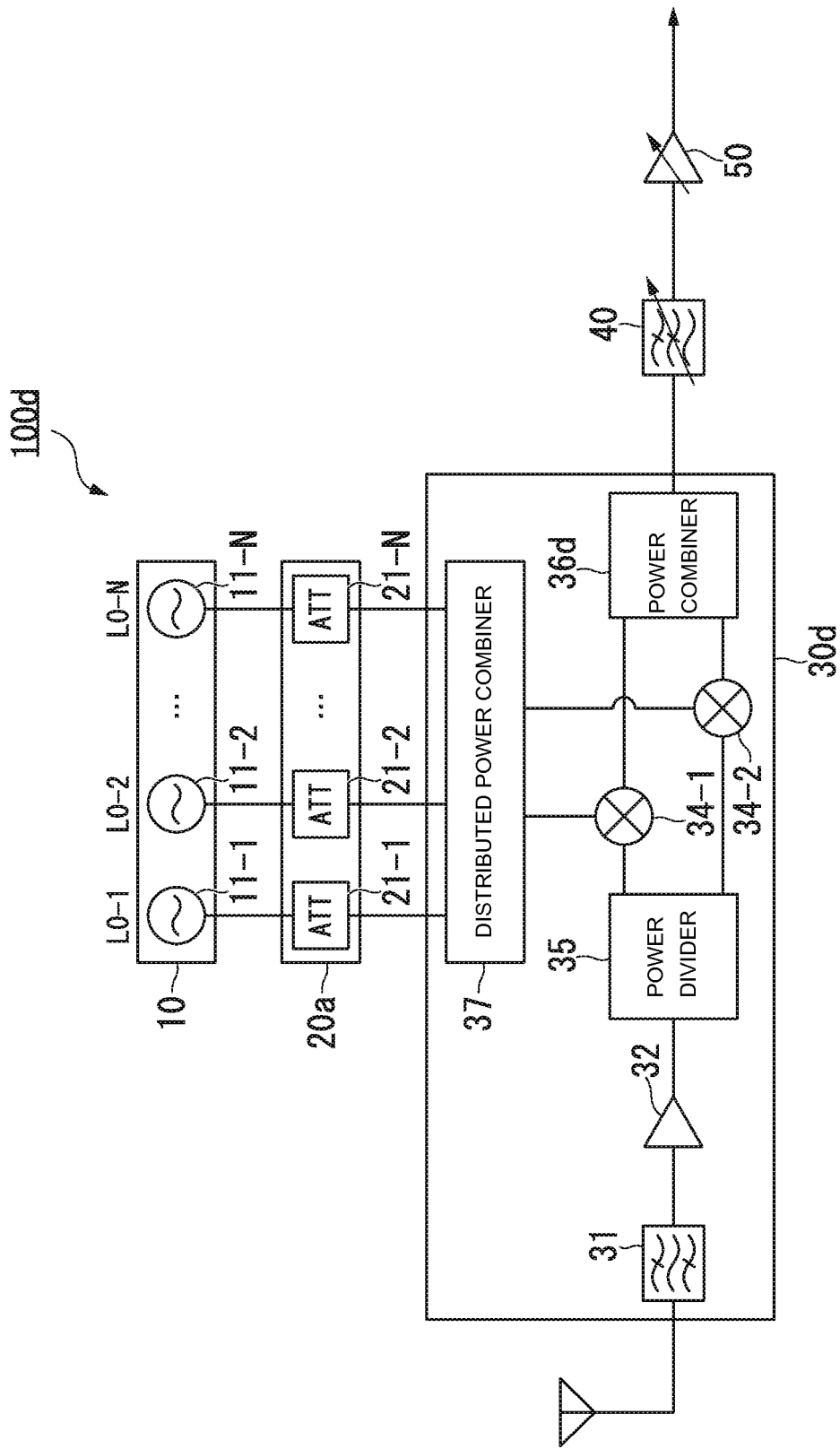
FIG. 7 A block diagram showing the constitution of a receiver according to a fourth embodiment of the present invention.

FIG. 7 is a block diagram showing the constitution of the receiver of the present embodiment. The constituent elements identical to those of the foregoing embodiments shown in FIGS. 1, 2, and 6 are denoted using the same reference signs.

Referring to FIG. 7, a receiver 100d includes the local signal generator 10, the power phase adjuster 20a, a frequency converter 30d, the frequency band limiter 40, and the variable gain amplifier 50.

The frequency converter 30d includes the band-pass filter 31, the low noise amplifier 32, the mixers 34-1, 34-2, a power divider 35, a power combiner 36d, and a distributed power combiner 37.

The mixers 34-1, 34-2 mix RF signals, amplified by the LNA 32, with local signals supplied from the LO 10, thus converting RF signals into frequencies of baseband signals. The mixers 34-1 and 34-2 are supplied with local signals with a phase difference of 90° therebetween.

The power combiner 36d combines baseband signals supplied from the mixers 34-1 and 34-2. The power combiner 36 performs combining while rotating the phase of an input signal, applied to one input terminal thereof, by 90°.

The distributed power combiner 37 performs half-split distribution and combining on a plurality of local signals supplied from the power phase adjuster 20a. The distributed power combiner 37 sets a phase difference of 90° to one of half-split local signals.

According to the above constitution, the frequency converter 30d is able to perform frequency conversion due to the image-suppression mixer configuration. The frequency converter 30d, employing the image-suppression mixer configuration, is able to reduce noise of image bands and unwanted waves.

By independently controlling the power phase adjusters 21-1, 21-2, ..., 21-N, it is possible to independently control the power of LO signals in the mixers 34-1, 34-2, thus independently controlling the conversion gains of mixers for LO frequencies.

The frequency conversion of the receiver of the present embodiment will be described with reference to FIGS. 8A and 8B.

Figure 8A:
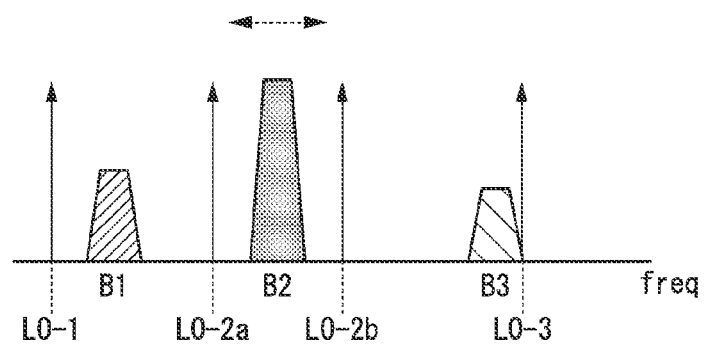
FIG. 8A A drawing illustrating the operation of the receiver according to the fourth embodiment of the present invention.

FIG. 8A shows the frequency allocation of RF signals, which are extracted by the BPF 31, amplified by the LNA 32, and then supplied to the mixers 34, as well as the frequency allocation of LO signals. In FIG. 8A, the horizontal axis represents the frequency range of RF signals whilst the vertical axis represents the signal power of frequency bands (bands).

This drawing shows the situation in which RF signals of bands B1 to B3 are received in the ascending order of frequencies, wherein an RF signal of band B2 is higher in signal power than other channels.

Additionally, this drawing shows the correlation between frequencies LO-1, LO-2a (or LO-2b) of local signals, supplied from the LO 10, and frequency bands of RF signals.

Band B1 is allocated to the higher frequency band than the frequency of each local signal relative to an oscillation signal of frequency LO-1; band B2 is allocated to the higher frequency band than the frequency of each local signal relative to a local signal of frequency LO-2a (or the higher frequency band than the frequency of each local signal relative to a local signal of frequency LO-2b); and band B3 is allocated to the higher frequency band than the frequency of each local signal relative to a local signal of frequency LO-3.

Prior to frequency conversion with the frequency converter 30d, the foregoing signals are converted into frequencies, representing differences between their frequencies and frequencies of local signals, and allocated to a baseband. It is possible to convert them into desired frequencies in a baseband by selecting frequencies LO-1 to LO-3 of local signals with appropriate intervals in connection with frequencies of bands B1 to B3. Thus, it is possible to juxtapose bands in a low frequency range with narrow intervals therebetween. At this time, it is necessary to set the relationship between frequencies of local signals and frequencies of bands prior to frequency conversion such that bands after frequency conversion will not overlap with each other.

Figure 8B:
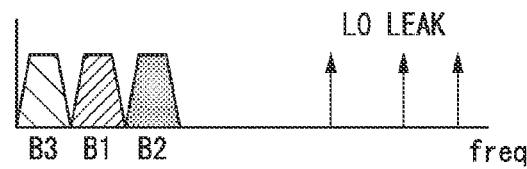
FIG. 8B A drawing illustrating the operation of the receiver according to the fourth embodiment of the present invention.

FIG. 8B shows the result of frequency conversion on signals of bands shown in FIG. 8A.

In FIG. 8B, the horizontal axis represents the frequency range of baseband signals whilst the vertical axis represents the signal power in frequencies (channels). Signals shown in this drawing are signals which are subjected to frequency conversion with the frequency converter 30 and then outputted via the frequency band limiter 40 and the VGA 50.

Based on the result of frequency conversion, bands are allocated in the order of ones proximate to DC, i.e. bands B3, B1, and B2. Herein, band B2 indicates the situation in which the power thereof is attenuated to the same level as other bands B1, B3. This may cause leakage of local signals and unwanted signals such as cross modulation distortions in a high frequency range, but the frequency band limiter 40 is able to suppress the power of unwanted signals.

Owing to the combining via the power combiner 36, an image-suppression mixer selects signals, which should be outputted to an output terminal, depending on whether they are each allocated to either the lower frequency band than the frequency of each local signal or higher frequency band than the frequency of each local signal. Non-selected bands exhibit the same amplitude but the reverse phase in the power combiner 36, so that they are canceled out each other. Due to the presence of amplitude errors and phase errors, however, they cannot be completely canceled out, so that leakage signals, which should have been blocked, may be attenuated but outputted. The present embodiment positively utilizes attenuation characteristics due to leakage; therefore, it is possible to reduce signal power, regarding signals of bands having high signal power, by way of frequency conversion precluding leakage, and it is possible to reduce power differences compared with the signal power of other bands. As shown in FIG. 8A, it is possible to switch over LO-2 whether it is allocated to either a low frequency side (i.e. the position of LO-2a) relative to band B2 or a high frequency side (i.e. the position of LO-2b), i.e. whether it is allocated to the higher frequency band than the frequency of each local signal or the lower frequency band than the frequency of each local signal.

As described above, the controller 80 sets frequencies of local signals of the LO 10; therefore, it is possible to suppress signals of channels having high signal power, and it is possible to allocate signals of bands into a limited frequency range.

Fifth Embodiment

Figure 9A:
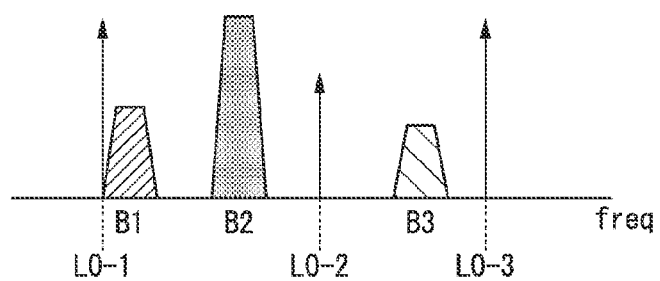
FIG. 9A A drawing illustrating the operation of a receiver according to a fifth embodiment of the present invention.

Next, another frequency conversion with the frequency converter 100d shown in FIG. 7 will be described with reference to FIGS. 9A and 9B. FIG. 9A shows frequency allocation of RF signals which are extracted by the BPF 31, amplified by the LNA 32, and then supplied to the mixers 34. In FIG. 9A, the horizontal axis represents the frequency range of RF signals whilst the vertical axis represents the signal power of frequency bands (bands).

This drawing shows the situation in which RF signals of bands B1 to B3 are received in the ascending order of frequencies, wherein an RF signal of band B2 indicates higher signal power than other channels.

Additionally, this drawing shows the correlation between frequencies LO-1, LO-2, LO-3 of local signals, supplied from the LO 10, and frequency bands of RF signals. A local signal of frequency LO-2 exhibits smaller amplitude, i.e. smaller signal power, than other local signals by way of the power phase adjuster 20d.

Band B1 is allocated to the higher frequency band than the frequency of each local signal relative to a local signal of frequency LO-1, which is positioned in proximity to the lower limit of a frequency band of band B1. Band B2 is allocated to the lower frequency band than the frequency of each local signal relative to a local signal of frequency LO-2, while band B3 is allocated to the lower frequency band than the frequency of each local signal relative to a local signal of frequency LO-3.

Due to frequency conversion with the frequency converter 30d, the foregoing signals are converted into frequencies, representing differences between their frequencies and frequencies of local signals, and allocated into a baseband. Since they can be converted into desired frequencies in a baseband by selecting frequencies LO-1 to LO3 of local signals with appropriate intervals in connection with frequencies of bands B1 to B3, it is possible to closely juxtapose bands with narrow intervals therebetween in a low frequency range. At this time, it is necessary to set the relationship between frequencies of local signals and frequencies of bands prior to frequency conversion such that bands after frequency conversion will not overlap with each other.

Figure 9B:
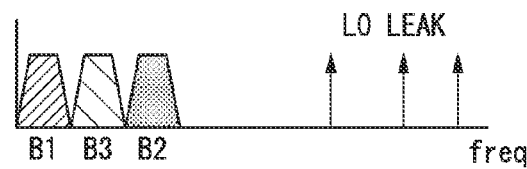
FIG. 9B A drawing illustrating the operation of the receiver according to the fifth embodiment of the present invention.

FIG. 9B shows the result of frequency conversion on signals of bands shown in FIG. 9A.

In FIG. 9B, the horizontal axis represents the frequency range of baseband signals whilst the vertical axis represents the signal power in frequencies (channels). Signals shown in this drawing are signals which are subjected to frequency conversion with the frequency converter 30 and then outputted via the frequency band limiter 40 and the VGA 50.

Based on the result of frequency conversion, bands are allocated in the order of ones proximate to DC, i.e. bands B1, B3, and B2. Herein, band B2 indicates the situation in which the power thereof is attenuated to be lower than signals of other bands B1, B3. Additionally, leakage of local signals occurs in a high frequency range.

Moreover, a local signal of frequency LO-2 is lower in signal power than other local signals; therefore, in the process of frequency conversion, it is possible to reduce signal power of band B2 which is subjected to frequency conversion using its local signal, and it is possible to reduce differences of signal power compared to other bands.

As described above, the controller 80 sets frequencies of local signals of the LO 10 and an attenuation ratio of the power phase adjuster 20b; therefore, it is possible to suppress signals of channels having high signal power, and it is possible to allocate signals of bands into a limited frequency range.

Sixth Embodiment

Next, a receiver according to a sixth embodiment of the present invention will be described with reference to FIG. 10.

Figure 10:
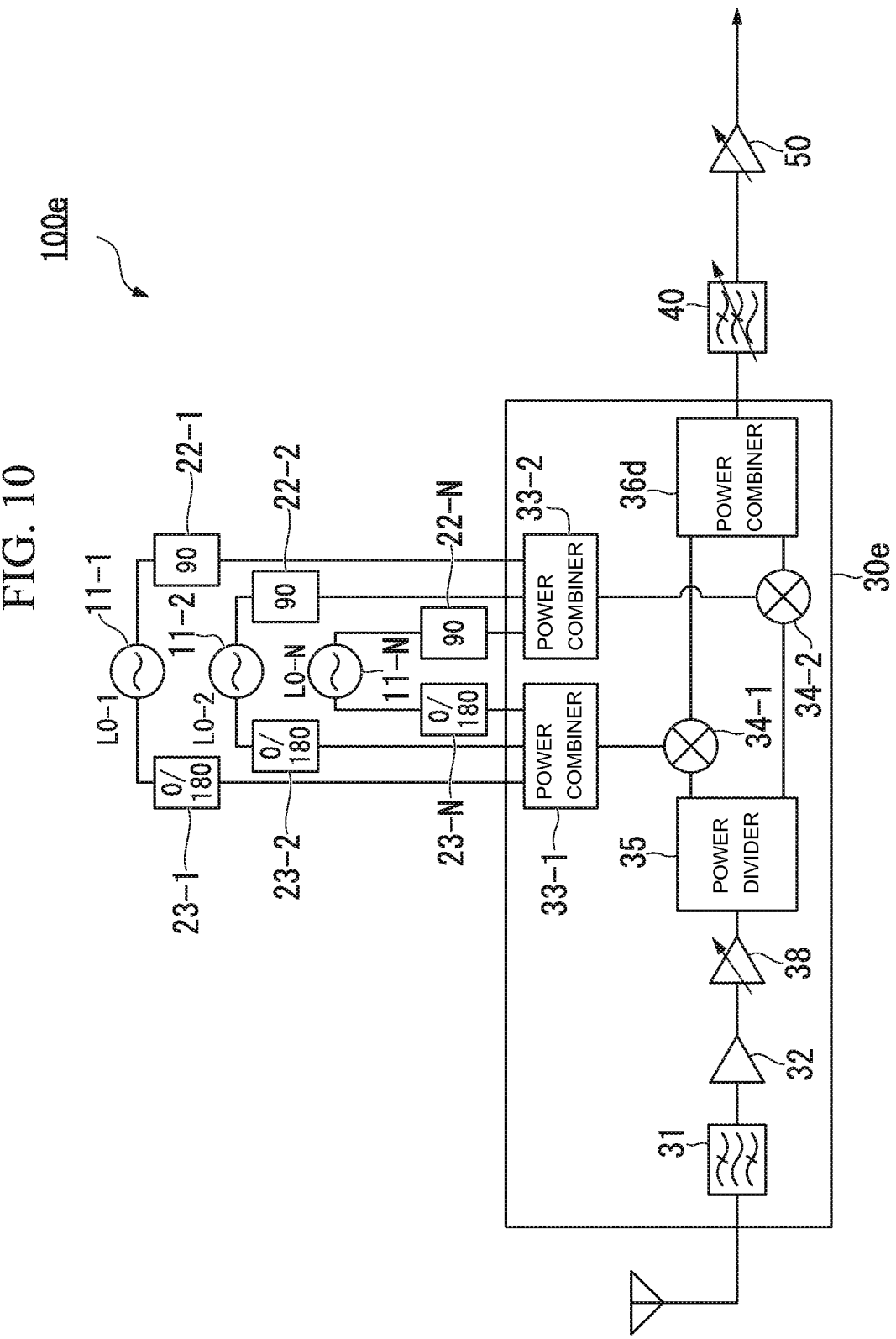
FIG. 10 A block diagram showing the constitution of a receiver according to a sixth embodiment of the present invention.

FIG. 10 is a block diagram showing the constitution of the receiver of the present embodiment. The constituent elements identical to those of the first embodiment shown in FIGS. 1 and 2 are denoted using the same reference signs.

Referring to FIG. 10, a receiver 100e includes a local signal generator (LO) including a plurality of local oscillators 11-1, 11-2, ..., 11-N. The latter stage and the former stage of the local oscillators 11-1, 11-2, ..., 11-N are connected to phase shifters 22-1, 22-2, ..., 22-N (collectively referred to as phase shifters 22) and phase shifters 23-1, 23-2, ..., 23-N (collectively referred to as phase shifters 23). A power phase adjuster is configured of the phase shifters 22 and 23.

The phase shifters 22 forward local signals, supplied from the LO 10, while rotating their phases by 90°.

The phase shifters 23 forward local signals, supplied from the LO 10, while directly transmitting them therethrough or rotating their phases by 180° based on the setting. That is, rotating phases by 180° is equivalent to the inversion of supplied signals, for example, wherein it can be realized using one stage of source-grounded amplifiers with a gain of 0 dB (decibel).

A frequency converter 30e is connected to the phase shifters 22 and 23. The frequency converter 30e includes the band-pass filter 31, the low noise amplifier 32, power combiners 33-1, 33-2, the mixers 34-1, 34-2, the power divider 35, a power combiner 36d, and a variable gain amplifier (VGA) 38. The frequency converter 30e is connected to the frequency band limiter 40 and the variable gain amplifier 50.

The power combiners 33-1, 33-2 combine and output local signals having different frequencies supplied thereto.

The variable gain amplifier (VBA) 38 performs amplification to signal power necessary for frequency conversion.

Figure 11A:
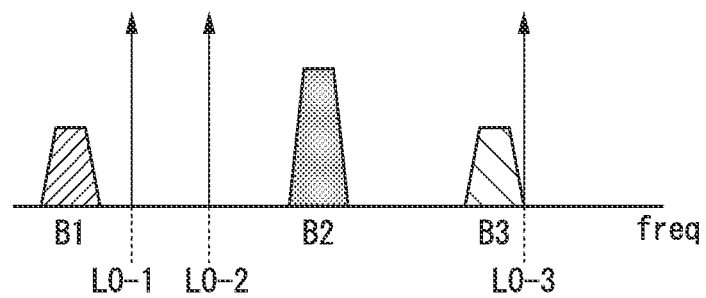
FIG. 11A A drawing illustrating the operation of the receiver according to the sixth embodiment of the present invention.

The frequency conversion of the receiver 100e shown in FIG. 10 will be described with reference to FIGS. 11A and 11B. FIG. 11A shows the frequency allocation of local signals and the channel allocation of RF signals, which are extracted by the BPF 31, amplified by the LNA 32, and then supplied via the mixers 34. In FIG. 11A, the horizontal axis represents the frequency range of RF signals whilst the vertical axis represents the signal power of frequency bands (bands).

This drawing shows the situation in which RF signals of bands B1 to B3 are received in the ascending order of frequencies, wherein an RF signal of band B2 is higher in signal power than other channels.

Additionally, this drawing shows the correlation between frequencies LO-1, LO-2, LO-3 of local signals, supplied from the LO 10, and frequencies of RF signals. All the local signals are set to the same signal power.

Band B1 is allocated to the lower frequency band than the frequency of each local signal relative to a local signal of frequency LO-1; band B2 is allocated to the higher frequency band than the frequency of each local signal relative to a local signal of frequency LO-2; and band B3 is allocated to the lower frequency band than the frequency of each local signal relative to a local signal of frequency LO-3.

Owing to the frequency conversion of the frequency converter 30e, the foregoing signals are converted into frequencies representing differences between their frequencies and frequencies of local signals and allocated into a baseband. Since they can be converted to desired frequencies in a baseband by selecting frequencies LO-1 to LO-3 of local signals relative to frequencies of bands B1 to B3 with appropriate intervals therebetween, it is possible to closely juxtapose bands in a low frequency range with narrow intervals therebetween. At this time, it is necessary to set the relationship between frequencies of local signal and frequencies of bands prior to frequency conversion such that bands after frequency conversion will not overlap with each other.

Figure 11B:
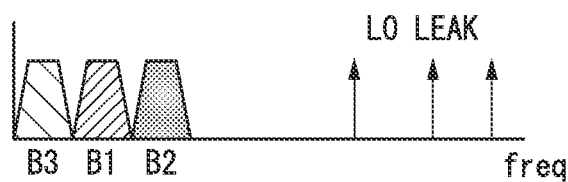
FIG. 11B A drawing illustrating the operation of the receiver according to the sixth embodiment of the present invention.

FIG. 11B shows the result of the frequency conversion on signals of bands shown in FIG. 11A.

In FIG. 11B, the horizontal axis represents the frequency range of baseband signals whilst the vertical axis represents the signal power in frequencies (channels). Signals shown in this drawing are signals which are subjected to frequency conversion with the frequency converter 30 and then outputted via the frequency band limiter 40 and the VGA 50.

Based on the result of the frequency conversion, bands are allocated in the order of ones proximate to DC, i.e. bands B3, B1, and B2. This shows the situation in which a signal of band B2 is attenuated in power to be lower than signals of other bands B1, B3. Additionally, leakage of local signals and unwanted waves such as cross modulation distortions may occur in a high frequency range but they are suppressed with the frequency band limiter 40.

In the phase shifters 23, when the phase setting of the phase shifter 23-2, corresponding to a local signal of frequency LO-2, is switched from 0° to 180°, the phases of local signals input to the mixers 34-1, 34-2 are switched from (0°, 90°) to (180°, 90°). Using an image-suppression mixer configured of the power divider 35, the mixers 34-1, 34-2, and the power combiner 36d, it is possible to switch the frequency band, selected by the power combiner 36d, from the higher frequency band than the frequency of each local signal to the lower frequency band than the frequency of each local signal due to the above phase switching. That is, in principle, a local signal of frequency LO-2 may be canceled out with its counterpart signal having the same amplitude but a different phase since it belongs to the higher frequency band than the frequency of each local signal of band B2. However, due to amplitude and phase errors, they are not completely canceled out, thus causing attenuated leakage signals. The present constitution positively utilizes attenuation characteristics such that a signal of band B2 with high power is attenuated as a leakage signal whilst signals of bands B1, B3 are regarded as normally selectable signals in connection with local signals of other frequencies LO-1, LO-3; hence, it is possible to reduce differences of signal power in all bands.

As described above, the controller 80 sets the frequencies of local signals, generated by the LO 10, and phases of phase shifters 23 so as to suppress signals in channels with high signal power; therefore, it is possible to allocate signals of bands into a limited frequency range.

Seventh Embodiment

Next, a receiver according to a seventh embodiment of the present invention will be described with reference to FIG. 12.

Figure 12:
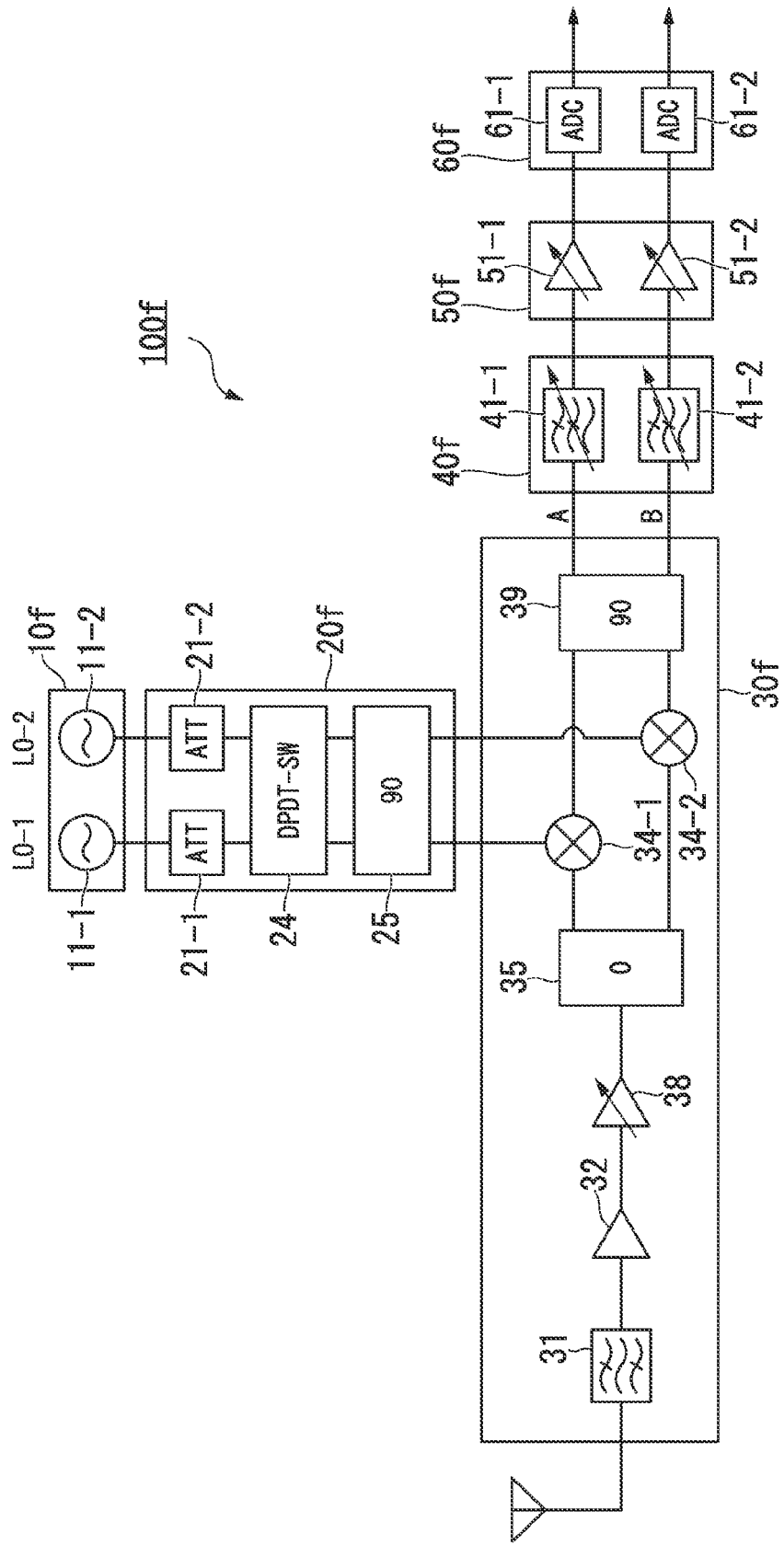
FIG. 12 A block diagram showing the constitution of a receiver according to a seventh embodiment of the present invention.

FIG. 12 is a block diagram showing the constitution of the receiver of the present embodiment. The constituent elements identical to those of the foregoing embodiments shown in FIGS. 1, 2, 7, and 10 are denoted using the same reference signs.

A receiver 100f shown in FIG. 12 includes a local signal generator (LO) 10f, a power phase adjuster 20f, a frequency converter 30f, a frequency band limiter 40f, a variable gain amplifier 50f, and an analog/digital converter 60f.

The local signal generator (LO) 10f includes a plurality of local oscillators 11-1, 11-2 outputting frequencies LO-1, LO-2.

The power phase adjuster 20f includes the variable attenuators (ATT) 21-1, 21-2, a selector 24, and a phase shifter 25.

The selector (DPDT-SW) 24 is a double-pole double-throw (DPDT) switch. The selector 24 is able to select two local signals input thereto so as to output one or both of them at output terminals thereof.

The phase shifter 25 converts two local signals, input thereto, into signals with a phase difference of 90°, thus delivering a local signal with a reference phase and another local signal with a phase of 90°. Herein, a local signal with a reference phase is supplied to the mixer 34-1 while a local signal with a phase of 90° is supplied to the mixer 34-2.

The frequency converter 30f includes the band-pass filter 31, the low noise amplifier 32, the mixers 34-1, 34-2, the power divider 35, the variable gain amplifier (VGA) 38, and a distributed power combiner 39.

The distributed power combiner 39 combines two signals inputted thereto with a phase difference of ±90°, thus separately outputting signals. Through the switching of the selector (DPDT-SW) 24, it is possible to switch the destination of the lower frequency band than the frequency of each local signal or higher frequency band than the frequency of each local signal to either a signal A or a signal B. For example, it is possible to switch the lower frequency band than the frequency of each local signal of frequency LO-1 to a signal A while switching the higher frequency band than the frequency of each local signal to signal B, and it is possible to switch the higher frequency band than the frequency of each local signal of frequency LO-2 to a signal A while switching the lower frequency band than the frequency of each local signal to a signal B.

The frequency band limiter 40f includes band-pass filters (BPF) 41-1, 41-2 which operate independently of each other.

The BPFs 41-1, 41-2 have their transmission characteristics relating to the same frequency range, wherein it is possible to determine a gain of a passing band, a center frequency, and a frequency bandwidth based on the setting. That is, upon receiving excessive signals, the BPFs 41-1, 41-2 may be each reduced in a passing-band gain so as to optimize signal power transferred to the latter stage.

The variable gain amplifier 50f includes variable gain amplifiers 51-1, 51-2 whose amplification factors can be independently determined.

Thus, the frequency band limiter 40f and the variable gain amplifier 50f are able to independently determine amplification factors applied to signals A and B output from the frequency converter 30f; therefore, it is possible to optimize signal power input to the analog/digital converter 60f.

Figure 13A:
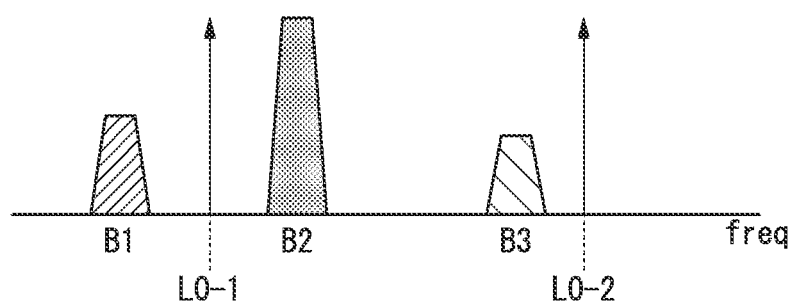
FIG. 13A A drawing illustrating the operation of the receiver according to the seventh embodiment of the present invention.

The frequency conversion of the receiver 100f shown in FIG. 12 will be described with reference to FIGS. 13A to 13C. FIG. 13A shows the frequency allocation of local signals and the channel allocation of RF signals which are extracted by the BPF 31, amplified by the LNA 32, and then supplied to the mixers 34. In this drawing, the horizontal axis represents the frequency range of RF signals whilst the vertical axis represents the signal power in frequencies (bands).

This drawing shows the situation in which RF signals of bands B1 to B3 are received in the ascending order of frequencies, wherein an RF signal of band B2 has higher signal power than other channels.

This drawing shows the correlation between frequencies LO-1, LO-2 of local signals, supplied from the LO 10, and frequency bands of RF signals. All the local signals are set to the same signal power.

Band B1 is allocated to the lower frequency band than the frequency of each local signal relative to a local signal of frequency LO-1, whilst band B2 is allocated to the higher frequency band than the frequency of each local signal relative to a local signal of frequency LO-1. A local signal of frequency LO-1 is selected as a frequency between bands B1 and B2. Band B3 is allocated to the lower frequency band than the frequency of each local signal relative to a local signal of frequency LO-2. A local signal of frequency LO-2 is selected as a frequency by which a signal of band B3 can be converted to a low frequency lower than a frequency range corresponding to a half of a frequency interval between bands B1 and B2.

Owing to the frequency conversion of the frequency converter 30f, the foregoing signals are converted into frequencies representing differences between their frequencies and frequencies of local signals and allocated to a baseband. Since they can be converted into desired frequencies in a baseband by selecting frequencies LO-1, LO-2 of local signals relative to frequencies of bands B1 to B3 with appropriate intervals therebetween, it is possible to closely juxtapose bands in a low frequency range with narrow intervals therebetween. At this time, it is necessary to set the relationship between frequencies of local signals and frequencies of bands prior to frequency conversion such that bands after frequency conversion will not overlap with each other.

Figure 13B:
FIG. 13B A drawing illustrating the operation of the receiver according to the seventh embodiment of the present invention.
Figure 13C:
FIG. 13C A drawing illustrating the operation of the receiver according to the seventh embodiment of the present invention.

FIGS. 13B and 13C show the results of frequency conversion on signals of bands shown in FIG. 13A, wherein they show signals A, B output from the frequency converter 30f.

In this drawing, the horizontal axis represents the frequency range of baseband signals whilst the vertical axis represents signal power in frequencies (channels). Signals shown in this drawing are signals which are subjected to frequency conversion with the frequency converter 30f and then outputted via the frequency band limiter 40f and the VGA 50f.

Based on the result of the frequency conversion, bands B3 and B1, which are arranged in the order proximate to DC, are allocated to a signal A whilst band B2 is allocated to a signal B. Herein, it is possible to attenuate a signal of band B2 in signal power to be lower than signals of other bands B1, B3 by increasing an attenuation value with the frequency band limiter 41-2 and the variable gain amplifier 51-2, thus reducing its power difference compared to signal power of other bands.

The above example refers to attenuation of band B2 alone, but it is possible to independently control conversion gains, applied to three bands B1, B2, and B3, depending on a combination of the attenuation values of the variable attenuators (ATT) 21-1, 21-2, the setting of the selector (DPDT-SW) 24, the attenuation value with the frequency band limiter 41f and the variable gain amplifier 50f.

As described above, the controller 80 determines the setting regarding the frequencies of local signals of the LO 10f, the attenuation factor and the frequency switching of the power phase adjuster 20f, and the attenuation factor with the frequency band limiter 40f and the variable gain amplifier 50f; therefore, it is possible to suppress signals of channels with high signal power, and it is possible to allocate signals of bands into a limited frequency range.

Eighth Embodiment

Figure 14:
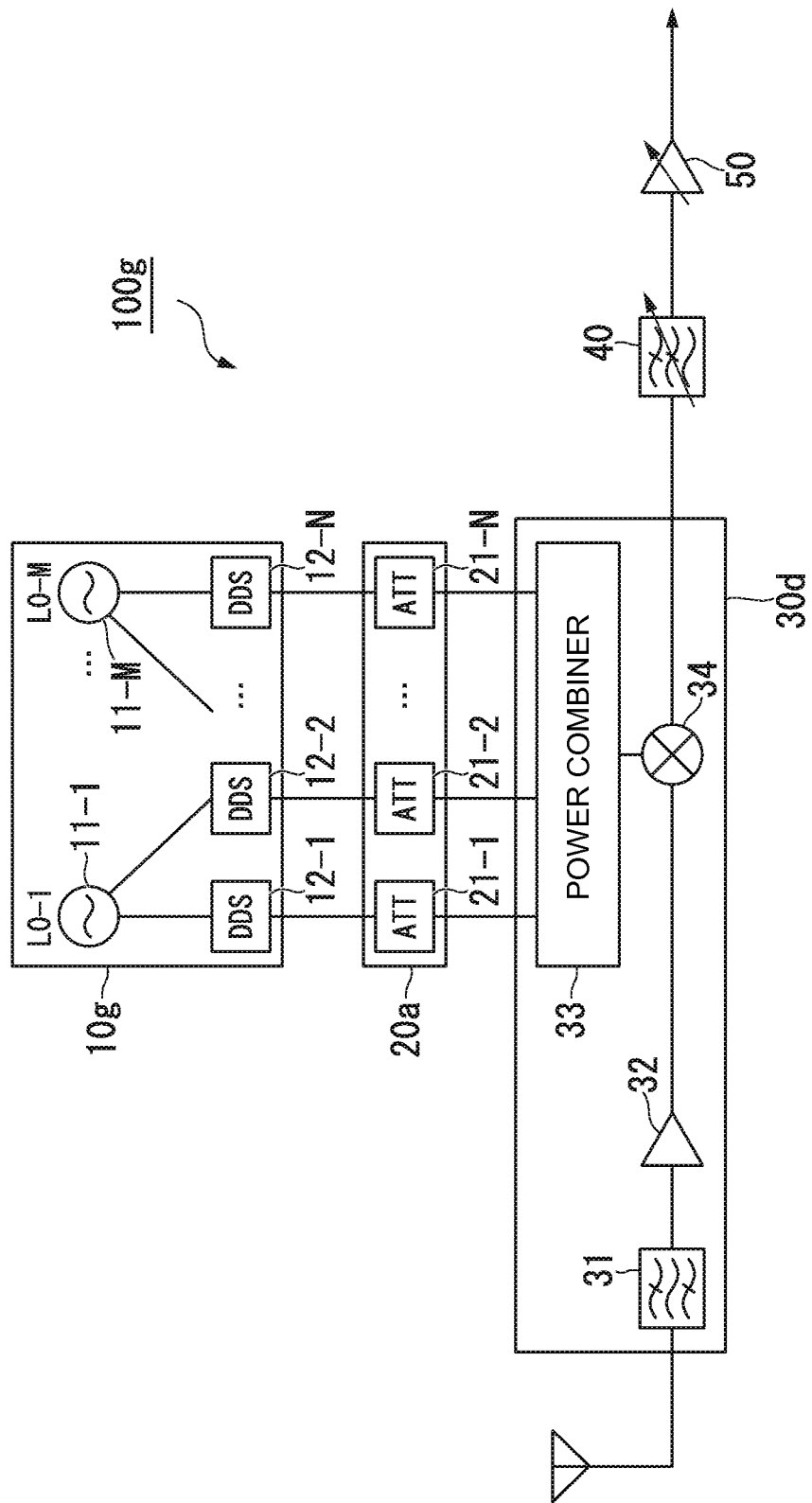
FIG. 14 A block diagram showing the constitution of a receiver according to an eighth embodiment of the present invention.

FIG. 14 is a block diagram showing the constitution of a receiver according to an eighth embodiment of the present invention. The constituent elements identical to those of the foregoing embodiments shown in FIGS. 1, 2, and 7 are denoted using the same reference signs.

Referring to FIG. 4, a receiver 100g includes a local signal generator (LO) 10g, the power phase adjuster 20a, the frequency converter 30d, the frequency band limiter 40, and the variable gain amplifier 50.

The LO 10g includes local signal generators 11-1, ..., 11-M (collectively referred to as local signal generators 11) and direct digital synthesizers (DDS) 12-1, 12-2, ..., 12-N (collectively referred to as DDS 12).

The local signal generator 11 supplies an oscillating clock signal to the DDS 12.

The DDS 12 uses the frequency of an oscillating clock signal supplied thereto as a reference signal, thus producing a local signal with a desired frequency based on the setting. Thus, it can be used as a frequency-variable local signal generator with a high-speed switching ability.

The above constitution can be employed instead of the LO 10 used in the foregoing embodiments.

This may reduce the number of oscillating clock signals and improve the degree of freedom in setting a frequency range for local signals to be generated; therefore, it is possible to form a receiver without fixedly using a plurality of local signal generators.

Ninth Embodiment

Figure 15:
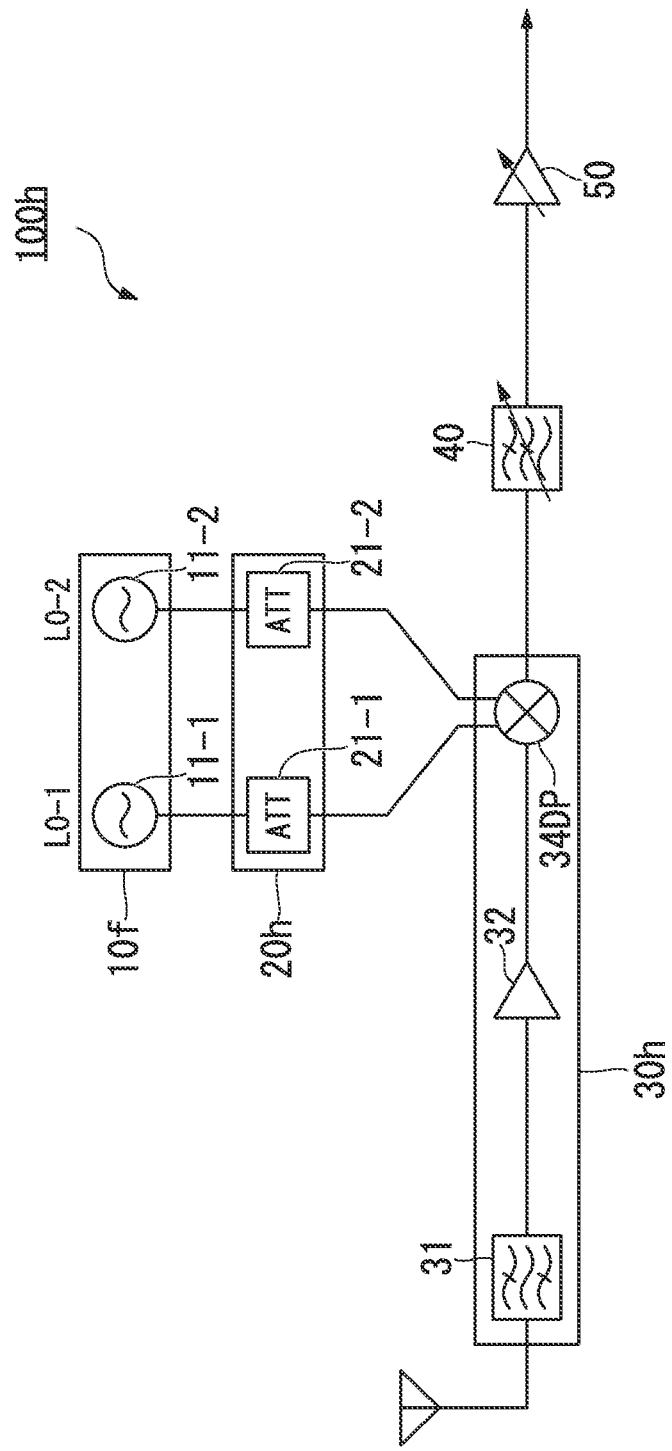
FIG. 15 A block diagram showing the constitution of a receiver according to a ninth embodiment of the present invention.

FIG. 15 is a block diagram showing the constitution of a receiver according to a ninth embodiment of the present invention. The constituent elements identical to those shown in FIGS. 1 and 2 are denoted using the same reference signs.

Referring to FIG. 15, a receiver 100h includes the local signal generator (LO) 10f, a power phase adjuster 20h, a frequency converter 30h, the frequency band limiter 40, and the variable gain amplifier 50.

The power phase adjuster 20h includes the variable attenuators (ATT) 21-1, 21-2.

The frequency converter 30h includes the band-pass filter 31, the low noise amplifier 32, and a mixer 34DP.

The mixer 34DP has input terminals for inputting two local signals but does need a power combiner disposed externally thereof, wherein it performs frequency conversion in response to two local signals having two frequencies input thereto.

The detailed constitution of the mixer 34DP will be described with reference to FIGS. 16A and 16B.

Figure 16A:
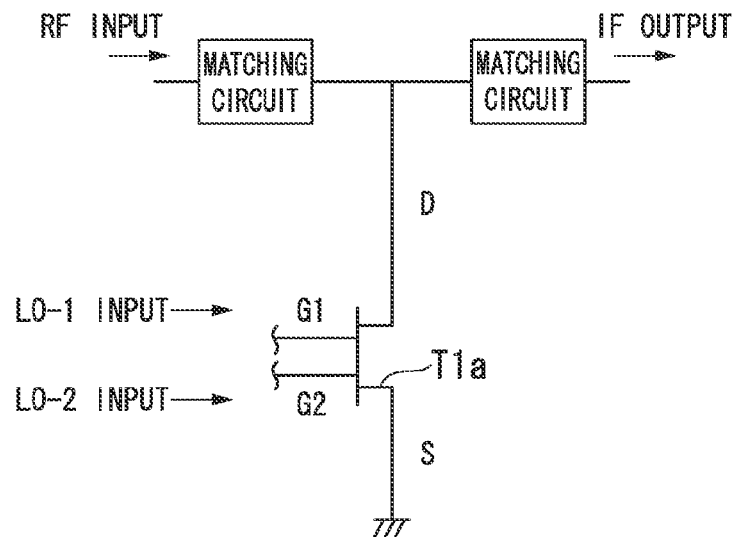
FIG. 16A A block diagram showing the constitution of a mixer according to the ninth embodiment of the present invention.

The constitution shown in FIG. 16A uses a dual gate transistor T1a for the mixer 34DP.

The source of the dual gate transistor T1a is grounded; the drain thereof is connected to a signal line; and the gates thereof are supplied with local signals LO-1, LO-2. The dual gate transistor T1a is able to change an amplification factor, applied to a multiband RF signal supplied to the drain, in response to two local signals supplied to the gates thereof. Additionally, it performs frequency conversion, serving as a mixer, in response to local signals LO-1, LO-2, thus producing a baseband signal.

Figure 16B:
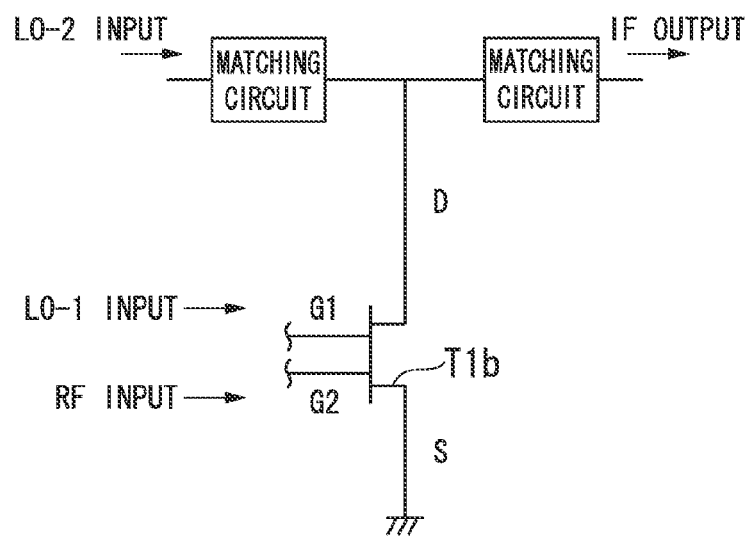
FIG. 16B A block diagram showing the constitution of another mixer according to the ninth embodiment of the present invention.

The constitution shown in FIG. 16B uses a dual gate transistor T1b for the mixer 34DP.

The source of the dual gate transistor T1b is grounded whilst the drain thereof is supplied with one local signal LO-1 and connected to a signal output terminal. Additionally, two gates are supplied with another local signal LO-2 and multiband RF signal. The dual gate transistor T1b is able to change an amplification factor, applied to a multiband RF signal supplied to another gate, in response to two local signals supplied to another gate and the drain thereof. Additionally, it performs frequency conversion, serving as a mixer, in response to local signals LO-1, LO-2, thus producing a baseband signal.

The foregoing embodiments are described based on the assumption that RF signals are converted into baseband signals; however, it is possible to convert them into IF signals instead of baseband signals. In this case, the first, second, fifth, and sixth embodiments prevent them from being converted into signals disposed proximate to DC components; hence, signals of bands with high signal power can be allocated to a cutoff frequency range close to a low cutoff frequency of the BPF 41 or the like.

In the foregoing embodiments, the local signal generator 10, which performs frequency conversion on signals included in a plurality of radio frequency bands, is able to supply a plurality of local signals. The power phase adjuster 20 adjusts local signals in terms of absolute power or relative phases. The frequency converter 30 performs frequency conversion, using local signals, with respect to radio frequency bands, thus sorting signals in a desired frequency range.

Thus, the receiver 100 is able to reduce an increase of circuit scale irrespective of the increasing number of radio frequency bands.

In the foregoing embodiments, the frequency converter 20 performs frequency conversion on signals included in a frequency range belonging to either the lower frequency band than the frequency of each local signal or the higher frequency band than the frequency of each local signal in response to a relative phase difference compared to each local signal.

Thus, the frequency converter 30 is able to extract signals included in a frequency range belonging to either the lower frequency band than the frequency of each local signal or the higher frequency band than the frequency of each local signal. Alternatively, the frequency converter 30 is able to set an amplification factor separately with respect to signals belonging to either the lower frequency band than the frequency of each local signal or the higher frequency band than the frequency of each local signal; hence, it is possible to collectively process a plurality of reception bands.

In the foregoing embodiments, the frequency converter 30 performs frequency conversion based on local signals while performing image suppression; alternatively, it outputs the lower frequency band than the frequency of each local signal and the higher frequency band than the frequency of each local signal separately.

Thus, the frequency converter 30 is able to perform image suppression on signals, included in a frequency range belonging to either the lower frequency band than the frequency of each local signal or the higher frequency band than the frequency of each local signal, thus extracting them. Alternatively, the frequency converter 30 is able to set an amplification factor separately with respect to signals belonging to the lower frequency band than the frequency of each local signal or the higher frequency band than the frequency of each local signal; hence, it is possible to collectively process a plurality of reception bands.

In the foregoing embodiments, the power phase adjuster 20 generates and provides a pair of local signals, which are paired with a perpendicular phase difference therebetween, based on local signals.

Thus, the power phase adjuster 20 is able to generate a pair of local signals, which are paired with a perpendicular phase difference therebetween, based on local signals.

In the foregoing embodiments, the power phase adjuster 20 includes the phase shifter 23 which is able to switch over a relative phase difference between local signals with a perpendicular phase difference therebetween.

Thus, the power phase adjuster 20 is able to extract a signal whose allocation is switched to either the lower frequency band than the frequency of each local signal or the higher frequency band than the frequency of each local signal by switching over a relative phase difference between local signals with a perpendicular phase difference therebetween.

In the foregoing embodiments, the frequency converter 30 performs frequency conversion on signals included in at least one of frequency ranges belonging to the lower frequency band than the frequency of each local signal and the higher frequency band than the frequency of each local signal in response to the frequency of each local signal.

Thus, the frequency converter 30 is able to extract signals included in at least one of frequency ranges belonging to the lower frequency band than the frequency of each local signal and the higher frequency band than the frequency of each local signal. Alternatively, the frequency converter 30 is able to set an amplification factor separately with respect to signals belonging to the lower frequency band than the frequency of each local signal or the higher frequency band than the frequency of each local signal; hence, it is possible to collectively process a plurality of reception bands.

In the foregoing embodiments, the signal processor 70 detects power for each frequency band including radio signals subjected to frequency conversion. The controller 80 reduces a power difference between radio signals in frequency bands in response to the detected power, wherein it adjusts an attenuation value, in attenuating power of each local signal for each frequency band, or it adjusts any one of the frequency or the relative phase difference relating to each local signal.

Thus, the signal processor 70 detects power for each frequency band; and therefore, the controller 80 is able to suppress excessive signals or adjust a balance of signal power based on the amount of signal power for each frequency band. Additionally, it is possible to improve an efficiency of frequency allocation through frequency conversion, and it is therefore possible to convert signals, allocated to a plurality of frequency bands, into signals with limited amounts of information.

In the foregoing embodiments, the signal processor 70 is arranged at a position which differs from the frequency converter 30, so that it is supplied with signals, subjected to frequency conversion with the frequency converter 70, via a transmission means.

Thus, the receiver 100 can be configured as an integrally-unified receiver in which the place of receiving radio signals is separated from the place of the signal processor 70 whilst a necessary transmission means is arranged to transmit received signals and control signals. The transmission means may have an ability of transmitting frequency bands conveying baseband signals, which are produced through frequency conversion of radio signals; hence, the constitution thereof can be easily made in comparison with the constitution of directly receiving radio signals in a wide band. In this connection, the transmission means may selectively employ an analog signal transmission system or a digital signal transmission system.

The constitutions of the foregoing embodiments can be modified with respect to values and combinations thereof without changing the essential characteristics of the present invention.

Additionally, the signal processor 70 and the controller 80 may be configured to include a processor such as a CPU that operates based on stored programs, wherein it is possible to control various parts of the receiver 100 based on programs. Additionally, it is possible to realize the signal processor 70 and the controller 80 according to the processing conducted by the same CPU.

INDUSTRIAL APPLICABILITY

The present invention is applicable to any types of receivers each of which is able to perform communication using a plurality of radio bands, wherein it is possible to reduce an increase of the circuit scale irrespective of the increasing number of radio frequency bands.

REFERENCE SIGNS LIST

100 receiver
10 local signal generator
20 power phase adjuster
30 frequency converter
50 variable gain amplifier
60 analog/digital converter
70 signal processor
80 controller

The invention claimed is:

1. A receiver that performs frequency conversion on a plurality of radio frequency signals, said receiver comprising:
    a local signal generator having a plurality of local signal sources that supply a plurality of local signals;
    an adjuster that adjusts the local signals in terms of power or relative phases;
    a power combiner that combines the plurality of local signals whose signal power or phases are adjusted with the adjuster; and
    a frequency converter coupled to the power combiner that concurrently performs frequency conversion on the plurality of radio frequency signals by use of the adjusted local signals, thus sorting them in a desired frequency range.

2. The receiver according to claim 1, wherein the frequency converter converts the frequencies of the radio frequency signals, included in either a lower frequency band than the frequency of each local signal or a higher frequency band than the frequency of each local signal, in response to a relative phase difference between the local signals.

3. The receiver according to claim 1, wherein the frequency converter performs the frequency conversion based on the plurality of local signals while performing image suppression to reduce an unwanted waveform and noise in an image band, thus outputting the plurality of radio frequency signals separately in a lower frequency band than the frequency of each local signal or a higher frequency band than the frequency of each local signal.

4. The receiver according to claim 1, wherein the adjuster generates a pair of local signals with a perpendicular phase difference therebetween.

5. The receiver according to claim 1, wherein the adjuster further includes a relative phase difference setting part that switches over a relative phase difference between the local signals with a perpendicular phase difference therebetween.

6. The receiver according to claim 1, wherein the frequency converter converts the frequencies of the radio frequency signals, included in either a lower frequency band than the frequency of each local signal or a higher frequency band than the frequency of each local signal.

7. The receiver according to claim 1, wherein the local signal generator further includes a direct digital synthesizer supplying the local signals.

8. A receiver that performs frequency conversion on a plurality of radio frequency signals, said receiver comprising:
  a local signal generator that supplies a plurality of local signals;
  an adjuster that adjusts the local signals in terms of power or relative phases;
  a frequency converter that concurrently performs frequency conversion on the plurality of radio frequency signals by use of the adjusted local signals, thus sorting them in a desired frequency range;
  a signal processor that detects power of the frequency-converted radio frequency signals; and
  a controller which reduces a power difference of the radio frequency signals in response to the detected power and which adjusts an attenuation value attenuating the power of each local signal or adjusts either the frequency of each local signal or a relative phase difference between the local signals, thus allocating the radio frequency signals with a narrow frequency interval therebetween.

9. The receiver according to claim 8, wherein the radio frequency signals, subjected to frequency conversion with the frequency converter, are transmitted to the signal processor via a transmission means.

10. A receiver that receives a plurality of radio frequency signals, said receiver comprising:
  an adjuster that is connected to a plurality of local signal sources so as to adjust signal power or phases;
  a power combiner that combines a plurality of local signals whose signal power or phases are adjusted with the adjuster;
  a band-pass filter that is connected to an antenna receiving the plurality of radio frequency signals so as to pass the radio frequency bands of a desired frequency band therethrough;
  a low noise amplifier that is connected to the band-pass filter;
  a mixer that is connected to an output terminal of the low noise amplifier so as to perform frequency conversion on the radio frequency signals based on the plurality of local signals which are combined together with the power combiner;
  a filter that is supplied to pass the baseband or intermediate frequency signals from the mixer output; and
  a variable gain amplifier that is connected to the filter output.

* * * * *